(12) United States Patent
Newman et al.

(10) Patent No.: US 6,947,589 B2
(45) Date of Patent: Sep. 20, 2005

(54) DYNAMIC GAMUT MAPPING SELECTION (75) Inventors: Todd D. Newman, Palo Alto, CA (US);
Timothy L. Kohler, San Jose, CA (US); John S. Haikin, Fremont, CA (US)

(73) Assignee: Canon Kabushiki Kaisha, Tokyo (JP)

(*) Notice: Subject to any disclaimer, the term of this patent is extended or adjusted under 35 U.S.C. 154(b) by 682 days.

(21) Appl. No.: 09/956,040

(22) Filed: Sep. 20, 2001

(65) Prior Publication Data

US 2003/0053683 A1 Mar. 20, 2003

(51) Int. Cl.$^7$ ................................. G06K 9/00
(52) U.S. Cl. ............... 382/162; 382/167; 382/176; 382/190; 345/590; 345/589
(58) Field of Search .................. 382/162, 167, 382/165, 166, 170, 175, 176, 180, 190, 181, 275, 271–273, 252; 358/518–523, 3.01, 3.02, 3.09, 3.1, 3.14, 3.16, 3.21, 3.22, 3.13, 143.16; 345/589–590, 690–697; 348/254–256, 671–679

(56) References Cited

U.S. PATENT DOCUMENTS

| | | | |
|---|---|---|---|
| 5,208,911 A | 5/1993 | Newman et al. ............. 395/162 |
| 5,432,906 A | 7/1995 | Newman et al. ............. 395/162 |
| 5,546,474 A | 8/1996 | Zuniga ........................ 382/176 |
| 5,579,446 A * | 11/1996 | Naik et al. .................... 358/1.9 |
| 5,704,021 A | 12/1997 | Smith et al. ................. 395/109 |
| 5,767,978 A * | 6/1998 | Revankar et al. ........... 358/296 |
| 5,844,699 A | 12/1998 | Usami et al. ................ 358/518 |
| 5,893,101 A | 4/1999 | Balogh et al. ............... 707/100 |
| 5,895,464 A | 4/1999 | Bhandari et al. ............... 707/3 |
| 5,903,275 A | 5/1999 | Guay .......................... 345/430 |
| 5,930,783 A | 7/1999 | Li et al. .......................... 707/1 |
| 5,949,427 A | 9/1999 | Nishikawa et al. .......... 345/431 |
| 5,949,967 A | 9/1999 | Spaulding et al. ........... 395/109 |
| 6,006,013 A * | 12/1999 | Rumph et al. ............. 358/1.15 |
| 6,023,527 A | 2/2000 | Narahara ..................... 382/167 |
| 6,041,136 A | 3/2000 | Ohga .......................... 382/162 |
| 6,088,475 A | 7/2000 | Nagashima et al. ......... 382/162 |
| 6,229,915 B1 * | 5/2001 | Ohkubo ....................... 382/167 |
| 6,763,134 B2 * | 7/2004 | Cooper et al. .............. 382/162 |
| 2001/0040983 A1 * | 11/2001 | Nishikawa ................... 382/109 |
| 2002/0091736 A1 * | 7/2002 | Wall ............................ 707/513 |

OTHER PUBLICATIONS

Braun, Karen M., Raja Balasubramanian and Reiner Eschbach, "Development and Evaluation of Six Gamut–Mapping Algorithms for Pictorial Images", Proceedings of the 7th IS&T/SID Color Imaging Conference, pp. 144–148.

(Continued)

Primary Examiner—Kanjibhai Patel
Assistant Examiner—Ali Bayat
(74) Attorney, Agent, or Firm—Fitzpatrick, Cella, Harper & Scinto (57) ABSTRACT

The present invention is directed to a mechanism of dynamically selecting a gamut mapping component for use in a color management system which transforms colors specified in image data from a first color space to a second color space, the method comprising automatically generating prediction information for use in selecting from a plurality of gamut mapping components, wherein the prediction information is based on determined gamut mapping preferences corresponding to at least one characteristic of the image data, and automatically selecting at least one of the plurality of gamut mapping components based on the prediction information.

24 Claims, 10 Drawing Sheets

OTHER PUBLICATIONS

Braun, Karen M., Raja Balasubramanian and Steven J. Harrington, "Gamut–Mapping Techniques for Business Graphics", Proceedings of the 7th IS&T/SID Color Imaging Conference, pp. 149–154.

Morovic, Jan, "CIE Division 8—TC8–03: Survey of Gamut Mapping Papers", GMTC Survey: Morovic & Luo (1997a) (visited Jun. 26, 2001), <http://www.colour.org/tc8–03/survey/s_97mla.html> (1 page).

Morovic, Jan and M. Ronnier Luo, "Cross–Media Psychophysical Evaluation of Gamut Mapping Algorithms", Design Research Centre, University of Derby, Britannia Mill, United Kingdom, May 29, 1997, 4 pages.

Morovic, Jan and M. Ronnier Luo, "A Universal Algorithm for Colour Gamut Mapping", Colour & Imaging Institute, University of Derby, United Kingdom, Mar. 27, 1998, 9 pages.

Suzuki, Shoji, Masayoshi Shimizu and Satoshi Semba, "High–accuracy Color Reproduction (Color Management Systems)", FUJITSU Sci. Tech. Journal, vol. 35 No. 2, Dec. 1999, pp. 240–247.

Morovic, Jan, "To Develop a Universal Gamut Mapping Algorithm", Thesis, University of Derby, Oct. 1998, pp. 1–203.

* cited by examiner

| NAME | INPUT | OUTPUT |
|---|---|---|
| ANALYZE_IMAGE | IMAGE | IMAGE CHARACTERISTICS |
| SELECT_GMA | IMAGE CHARACTERISTICS | GMA SELECTION |
| SEQUENCE_TRANSFORM | PROFILE(S), GMA SELECTION | TRANSFORM |
| APPLY_GMA | IMAGE, TRANSFORM | OUTPUT IMAGE |

*FIG. 10A*

| NAME | INPUT | OUTPUT |
|---|---|---|
| CREATE_TRANSFORM | PROFILE, INTENT | TRANSFORM DATA |
| TRANSFORM PIXELS | TRANSFORM DATA, IMAGE | OUTPUT IMAGE |

*FIG. 10B*

DYNAMIC GAMUT MAPPING SELECTION

BACKGROUND OF THE INVENTION

1. Field of the Invention

The present invention relates to the dynamic selection of a gamut mapping component of a color management system, and more particularly, to dynamic gamut mapping selection based on characteristics of image data and predictions with regard to a suitable GMA, the predictions based on determined preferences corresponding to the characteristics.

2. Description of the Related Art

A color device processes a color image using the range of colors that are available to it. Unfortunately, the same range of colors are not available across color devices. A color device typically uses a color management system, or module, to transform colors from one color space (e.g., RGB or CMYK) to another. Transformation of color image data into a device's color space typically entails the use of a gamut mapping algorithm (GMA) that maps the colors of an image to the gamut of colors of the color device.

Since it is not often the case that all of the colors of an image are reproducible within a color output device's gamut of colors, a color management system uses a GMA to transform each of the original colors in the device's color space to an appearance space. In addition to transforming the colors of a device's gamut of colors, the color management system usually transforms the colors into the output device's color space. These transformations of colors are ordinarily given in the form of mathematical expressions or as look-up tables.

In one example of a color management system, a CreateTransform program module is used to produce a color transform that includes color space and gamut transformations. The CreateTransform module normally takes as input a list of color device characterizations, called profiles. The GMA is contained in the output device's color profile. The color transform which is produced by CreateTransform becomes input to a TransformColors program module that operates on the input color data using the color transform. A FreeTransform program module returns system resources, such as memory, to the system and is executed once the transform is no longer needed.

Figure 1:
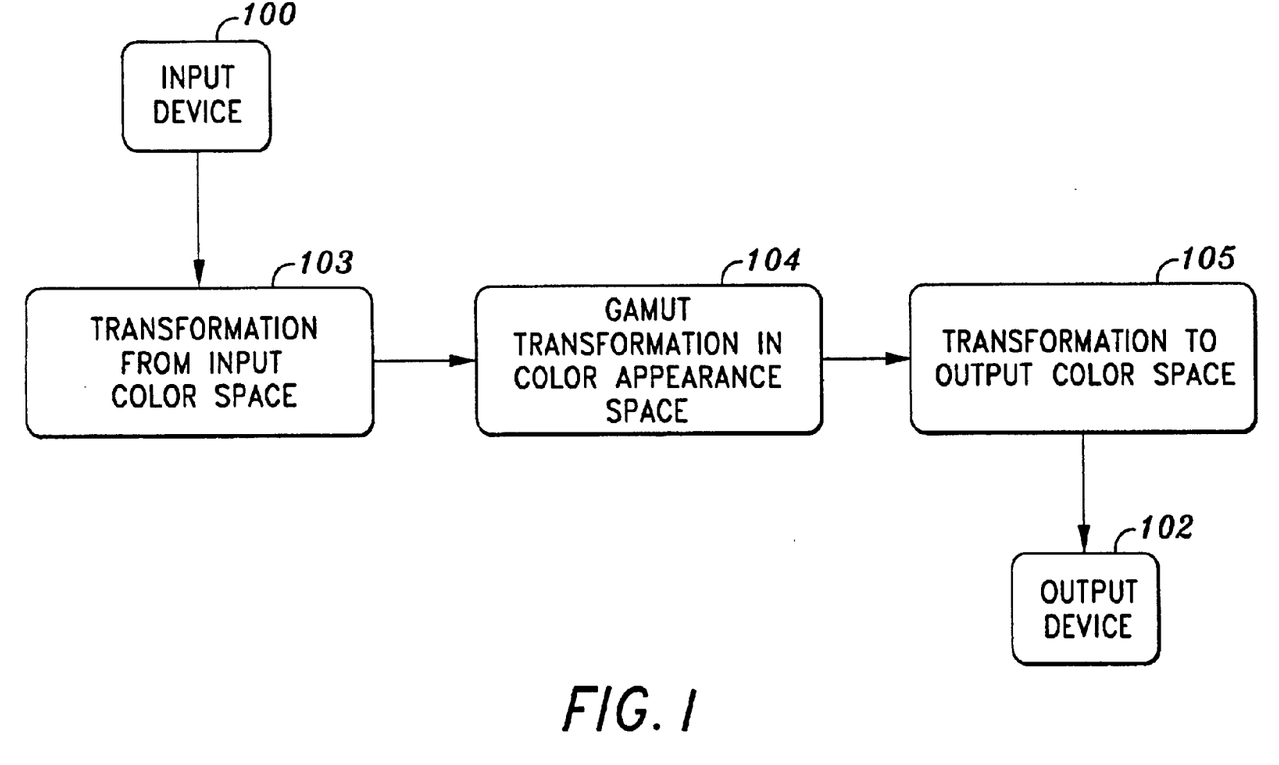
FIG. 1 illustrates a processing pipeline used by color management to transform color image data between color spaces and gamuts.

FIG. 1 illustrates a processing pipeline used by color management to transform color image data between color spaces and gamuts.

Input device 100 may be, for example, a color scanner which uses the RGB (Red, Green and Blue) color space. In the example, output device 102, which may be a color printer, uses a different color space such as the CMYK (Cyan, Magenta, Yellow and Black) color space. Image data generated by input device 100 using the RGB color space must be converted to CMYK color space for use by output device 102. In addition, those colors in the image data that are not able to be represented in the gamut of colors of output device 102 must be converted to the gamut of output device 102.

Blocks 103 to 105 illustrate a transformation pipeline that is used to perform the color space and gamut transformations. In block 103, the color data received from input device 100 is converted to a color appearance space, or a device-independent color space, such as CIELab. Block 104 performs gamut mapping from the gamut of input device 100 to the gamut of output device 102 using a GMA. Thereafter, the color data is converted from color appearance space to the color space of output device 102. Output device 102 can then generate output using the color data.

Block 104 uses a GMA to perform the gamut mapping, and the same GMA is used to transform an input image regardless of the image. Ideally, one GMA would be able to produce high quality output regardless of the image data; however, there is no known GMA that works best for all image data. For example, one GMA may be best suited for photographic image data but is not desirable when the image data contains graphics or text.

Therefore, it would be beneficial to be able to select a GMA that best fits particular image data. However, conventional approaches require that a user either directly specify a gamut mapping preference, or specify preferences which effect the resulting appearance of the image produced by the color management module.

In one conventional approach, which is described in U.S. Pat. No. 5,704,021 to Smith, et al. and U.S. Pat. No. 5,579,446 to Naik et al., a user specifies color matching options for different types of objects (i.e., text, photo and graphics) via a user interface. For example, the user may identify, for each object type, the type of adjustments to be made between the displayed image and the printed image. This approach is designed for use by a sophisticated user and/or someone willing to experiment with different option selections, or combinations thereof, to achieve a desired result. However, it is less than optimal for the user who either does not know enough, or does not wish to take the time, to specify the appropriate option designations to achieve a desired result.

In U.S. Pat. No. 6,006,013 to Rumph, et al., a PDL (Page Description Language) document creator may specify, in the form of a rendering tag associated with an object within the document, a gamut mapping preference. Based on the creator-generated gamut mapping preference as well as automatically-generated rendering tags, meta-data is generated for the objects in the PDL document that are intended to optimize the printing characteristics of an output device. Since gamut mapping information must be specified by someone, the same drawbacks exist as with the first-described approach.

Therefore, what is needed is an ability to automatically select a GMA based on characteristics of the color image data, and to provide a mechanism whereby a color management system is able to use the automatically-selected GMA.

SUMMARY OF THE INVENTION

The present invention addresses the foregoing problems and provides a mechanism for dynamically selecting a gamut mapping component for use in a color management system.

In one aspect of the invention, a method is provided of dynamically selecting a gamut mapping component for use in a color management system that transforms colors specified in image data from a first color space to a second color space, the method comprising automatically generating prediction information for use in selecting from a plurality of gamut mapping components, wherein the prediction information is based on determined gamut mapping preferences corresponding to at least one characteristic of the image data, and automatically selecting at least one of the plurality of gamut mapping components based on the prediction information In so doing, there is no need for a user to either identify an appropriate gamut mapping, or identify options from which gamut mapping is selected. The present invention may be used by unsophisticated users with no knowledge of gamut mapping and/or the effects that various option selections will have on given image data.

In another aspect of the invention, a system is provided for dynamically selecting a gamut mapping component for use in a color management system to transform colors specified in image data from a first color space to a second color space, the system comprising at least one image characterizer configured to automatically identify a characteristic of image data, a selection engine configured to generate prediction information for use in selecting from a plurality of gamut mapping components, wherein the prediction information is based on determined gamut mapping preferences corresponding to the characteristic of the image data, the selection engine is configured to automatically select at least one of the plurality of gamut mapping components based on the prediction information.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 2:
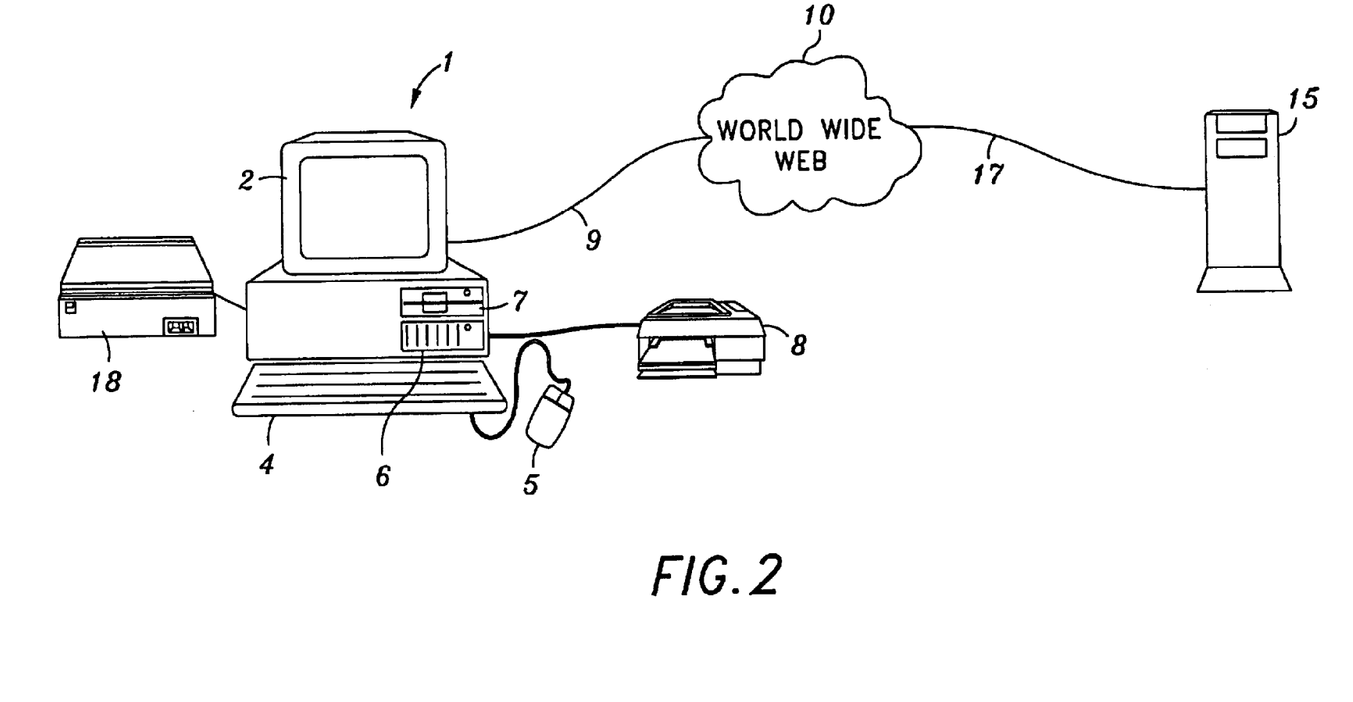
FIG. 2 is an outward view of a hardware environment embodying the present invention.

FIG. 2 is an outward view of representative computing hardware embodying the present invention. Shown in FIG. 2 are computer 1 executing a browser-enabled operating system, such as Microsoft Windows98®, Windows NT®, Windows 2000®, Windows XP®, etc., display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as a color management system, data files, and device drivers for controlling peripheral devices attached to computer 1, floppy disk drive 7 for use in reading data from and writing data to floppy disks inserted therein. Connected to computer 1 are printer 8 and scanner 18. Scanner 18, as well as other input devices (e.g., digital camera), may provide input from image device 100, for example. Similarly, printer 8 is one example of output device 102. Data and/or applications may also be accessed from a CD-ROM via a CD-ROM drive (not shown) or over a network, such as the World Wide Web ("WWW") 10, to which computer 1 may be connected.

Computer 1 may be connected to a network such as World Wide Web 10 via connection 9 to World Wide Web 10. While the invention is described with reference to the World Wide Web 10 (also referred to as the Internet), it should be apparent that the invention may be practiced with other types of networks such as an intranet, local area network, etc. Connection 9 may be formed, for example, via a serial modem (not shown) connected to computer 1 and a telephone line which, in turn, is connected to World Wide Web 10. It should be noted that computer 1 may be connected to World Wide Web 10 by other types of connections. Display page for display on monitor 2 as well as other data or applications for use by computer 1 can be received from World Wide Web 10 over connection 9.

Also connected to World Wide Web 10, via a connection 17, is web server 15, which receives requests for web pages and/or data from applications (e.g., a web browser application) running on computer 1 and sends a response (e.g., Web page, data, program code, etc.) to computer 1 over World Wide Web 10. It should be apparent while only one server 15 is shown in FIG. 2, additional instances of server 15 may be accessible via World Wide Web 10.

Like computer 1, web server 15 is a computing system that is executing an operating system, and may include a display monitor 2, keyboard 4 for entering text and commands and mouse 5 for manipulating and for selecting objects displayed on display monitor 2. Web server 15 further includes one or more disk drives (e.g., fixed disk drive 6, floppy disk drive 7 and/or a CD-ROM drive), in which are stored application programs, data and files, and device drivers for controlling peripheral devices.

A floppy disk drive, such as floppy disk drive 7 may be used to read data from and write data to floppy disks inserted therein. Data and/or applications may also be accessed from a CD-ROM via a CD-ROM drive (not shown) or over a network to which web server 15 may be connected.

Figure 3:
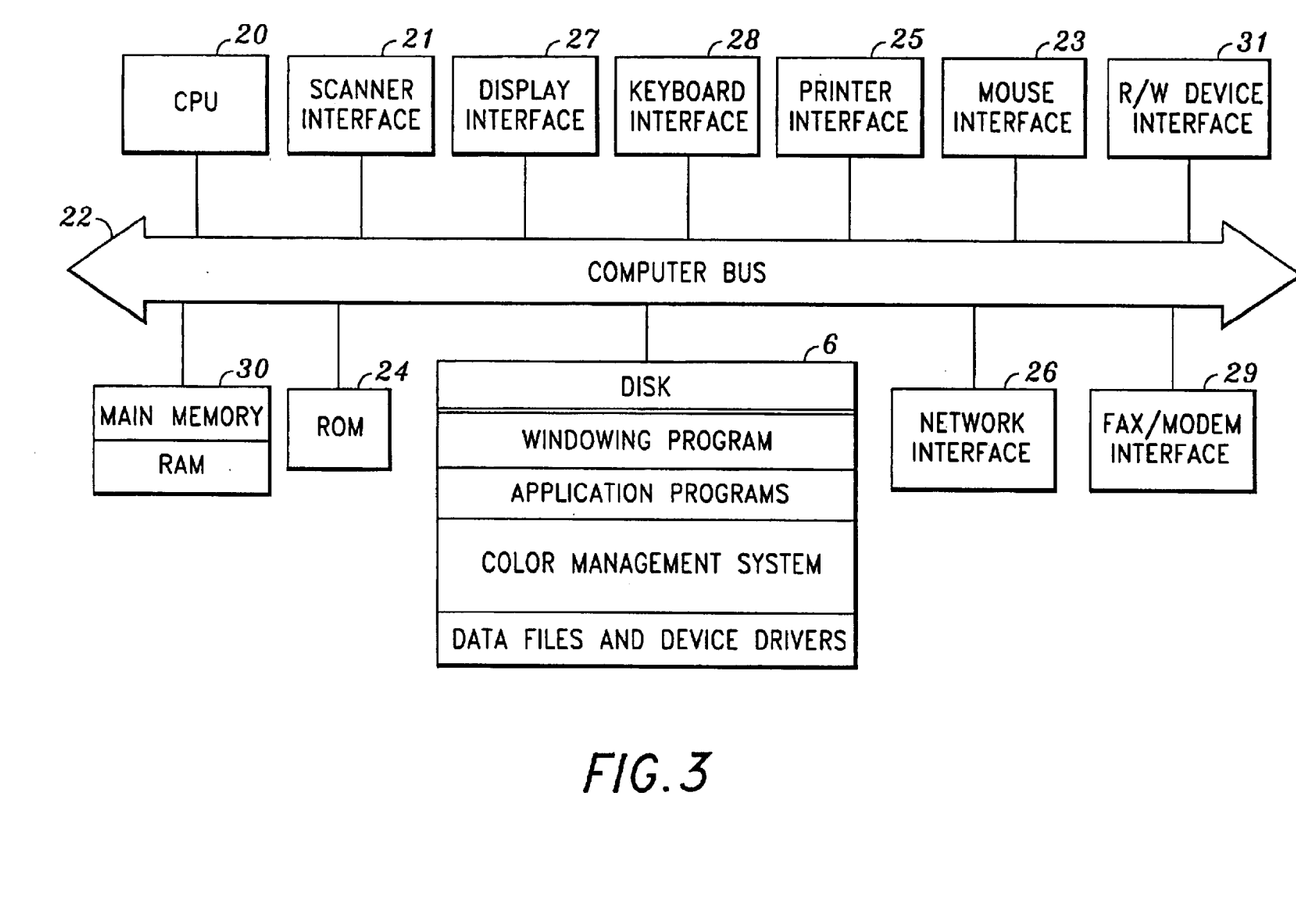
FIG. 3 is a block diagram of the internal architecture of a personal computer for use in conjunction with the present invention.

FIG. 3 is a block diagram of the internal architecture of computer 1. Shown in FIG. 3 are CPU 20, which is preferably a Pentium-type microprocessor, interfaced to computer bus 22. Also interfaced to computer bus 22 are printer interface 25, to allow computer 1 to communicate with printer 8, modem interface 29 to enable communications between computer 1 and its internal modem, display interface 27 for interfacing with display monitor 2, keyboard interface 28 for interfacing with keyboard 4, mouse interface 23 for interfacing with mouse 5, scanner interface 21 for interfacing with a scanning device, network interface 26 for interfacing with a network (e.g., World Wide Web 10) and interface 31 for interfacing with a device for reading from and/or writing to fixed or removable storage media (e.g., hard disk 6, CD-ROM, etc.). Of course, if computer 1 connects to World Wide Web 10 by a connection other than a telephone connection, a suitable interface other than modem interface 29 may be utilized.

Read only memory (ROM) 24 stores invariant computer-executable process steps for basic system functions such as basic I/O, start up, or reception of keystrokes from keyboard 4.

Main random access memory (RAM) 30 provides CPU 20 with memory storage which can be accessed quickly. In this regard, computer-executable process steps of program code are transferred from disk 6 over computer bus 22 to RAM 30 and executed therefrom by CPU 20.

Also shown in FIG. 3 is disk 6 which, as described above, includes a windowing operating system, a color management system which includes, or in some manner interfaces with, program code used to dynamically select a GMA according to the present invention. The program code may be stored on computer system 1 in RAM, disk 6, or on floppy disks readable by floppy disk drive 7. In addition, program code may be downloaded from server 15 via the World Wide Web 10. Other applications may include word processing, spreadsheet, graphics, and gaming applications. Disk 6 further includes data files and device drivers as shown.

Image data which includes pixel (or color component) data, and may include other data such as metadata, is examined in the present invention to extract characteristics of the image that are used to select a GMA for use in generating an output image using the gamut transformation provided by the selected GMA. The characteristics are used along with one or more weights associated with the GMAs to generate prediction information for each GMA, the prediction information is in turn used to select a GMA. As is described in more detail below, the prediction information is based on determined preferences that correspond to the characteristics.

Figure 4:
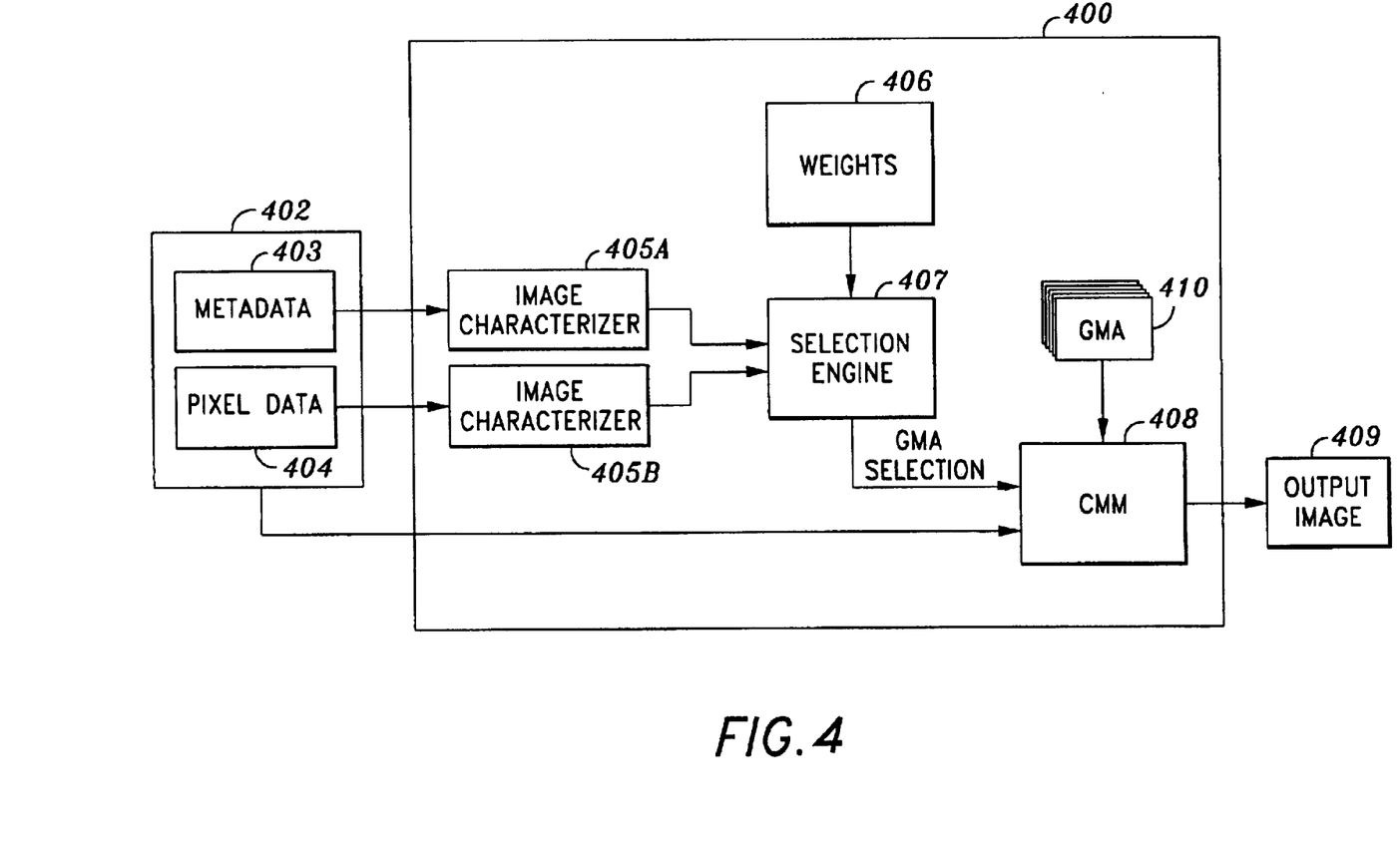
FIG. 4 provides a component illustration of GMA selection according to the present invention.

FIG. 4 provides a component illustration of GMA selection in color management module 400 according to the present invention. In the example of FIG. 4, image data 402 comprises metadata 403 and pixel data 404. While, in this example, both metadata 403 and pixel data 404 are used to select a GMA, it is possible to select a GMA according to the present invention using one or the other alone.

Examples of metadata 403 include, but are not limited to descriptional information such as a title, subject description, keywords or tags, image capture conditions (e.g., capture source, date/time of capture, aperture, exposure time, flash use), etc. The "DIG35 Specification", which is incorporated herein by reference, provides examples of metadata for use with digital images. File formats such as the MPEG 7, JPEG and EXIF file formats may include metadata in one form or another. However, any file format that accommodates the use of metadata may be used with the present invention.

Pixel data 404 comprise one or more bytes that represent a color, grayscale or bi-level representation of the pixel. In a color representation, each pixel defined by pixel data 404 comprises color component definitions for each component that makes up a color. For example, where color is defined in the RGB color space, each pixel is represented by red, green and blue color component data. Similarly, if the CMYK color space is used, a color is represented by cyan, magenta, yellow and black color component data. Pixel data 404 may be defined in other color spaces in addition to the RGB and CMYK color spaces. For example, a device independent color space (e.g., CIE XYZ, Lab and Luv) may be used to represent a color within pixel data 404. Pixel data may also be represented in a palletized format.

Metadata 403 is passed to image characterizer 405A and is parsed using a natural language interpreter or other interpreter. That is, image characterizer 405A analyzes metadata 403 to identify information contained therein so as to determine characteristics of image data 402 (e.g., a type such as a picture or business graphics) and passes its findings to selection engine 407. Selection engine 407 combines the information with known strengths and/or weaknesses of GMAs to select a GMA. For example, if metadata 405A contains aperture data, the image can be identified as a photograph, and a GMA that has been determined by the present invention to be preferred with photos may be selected by selection engine 407.

Image characterizers may include either statistical characteristics, semantic characteristics or both.

In semantic characterization approaches, pixel image data is interpreted to determine what pixel data 404 and/or metadata 403 represents. For example, a semantic characterizer may look for objects such as faces or landscapes in the pixel data 404 or examine metadata 403 to interpret what is represented by image 402.

In addition to the findings supplied by image characterizer 405A, findings from image characterizer 405B are supplied to selection engine 407. Image characterizer 405B operates on pixel data 404 to generate image characteristics. Image characterizers 404A and 405B may implement a semantic approach (described above), a statistical approach, or both.

A statistical approach compiles statistics by examining each pixel of image data to generate histograms or other statistical results (e.g., center of gravity or mean chroma). Examples of statistical characteristics include examination of pixels to detect redness, contrast, hue, chroma, colorfulness, flesh tones, clusters of colors, etc. Other examples of statistical characteristics that suggest business graphics include the presence of flat shaded areas (or a number of pixels of the same color), very smooth gradients or gradients used with known business-graphics imaging applications such as PowerPoint. Other statistical characterizers may determine when an image is high, mid or low key, determine the amount of texture in the image, or the texture at high saturation versus the texture at a low saturation within the image.

For example, as a redness characterizer, image characterizer 405B may determine a CIELAB metric hue angle and a CIELAB metric chroma for each pixel of pixel data 404, and determine the proportion of pixels that have a hue angle within a given range (e.g., between 22.5 and 67.5 degrees) and a CIELAB metric chroma that is equal to or exceeds a given threshold (e.g., 5.0). A hue image characterizer collects hue information for each of the pixels of pixel data 404 in a frequency table. Similarly, a chroma histogram image characterizer collects chroma information for each of the pixels in a frequency table. A colorfulness image characterizer determines the proportion of pixels with CIELAB metric chromas greater than or equal to a threshold value (e.g., 80). The above are meant as examples only, and it should be apparent that image characterizers 405A and 405B may be used to generate any type of image characteristics. In addition, any number of image characterizers 405A and 405B may be used with the present invention.

The findings of image characterizers 405A to 405B become input to selection engine 407 and are used to select a GMA to generate output image 409. That is, selection engine 407 uses the findings of image characterizers 405A to 405B to select a GMA, from GMAs 410, that is likely to provide a preferred output image from image 402 based on determined preferences for GMAs 410. Examples of GMAs 410 include, but are not limited to, Carisma, CLLIN, CINC, LLIN, LNLIN, LCLIP, LSLIN and GCUSP. A discussion of such gamut mapping algorithms may be found in the doctoral dissertation of Jan Marovic entitled "To Develop a Universal Gamut Mapping Algorithm" (University of Derby, 1997), which is incorporated herein by reference. The selected GMA is used by Color Management Module 408 to generate output image 409 from image 402.

The selection that is made by selection engine 407 is based on the characteristics of image 402 as well as weights 406. Weights 406 are generated based on the preferences of one or more observers for output images generated by GMAs 410 from input images having the same, or similar, characteristics as image 402. As is explained in more detail below, image characteristics are coupled with weights 406 to generate predictions for GMAs 410 that are used by selection engine 407 to select a GMA from GMAs 410.

Figure 5:
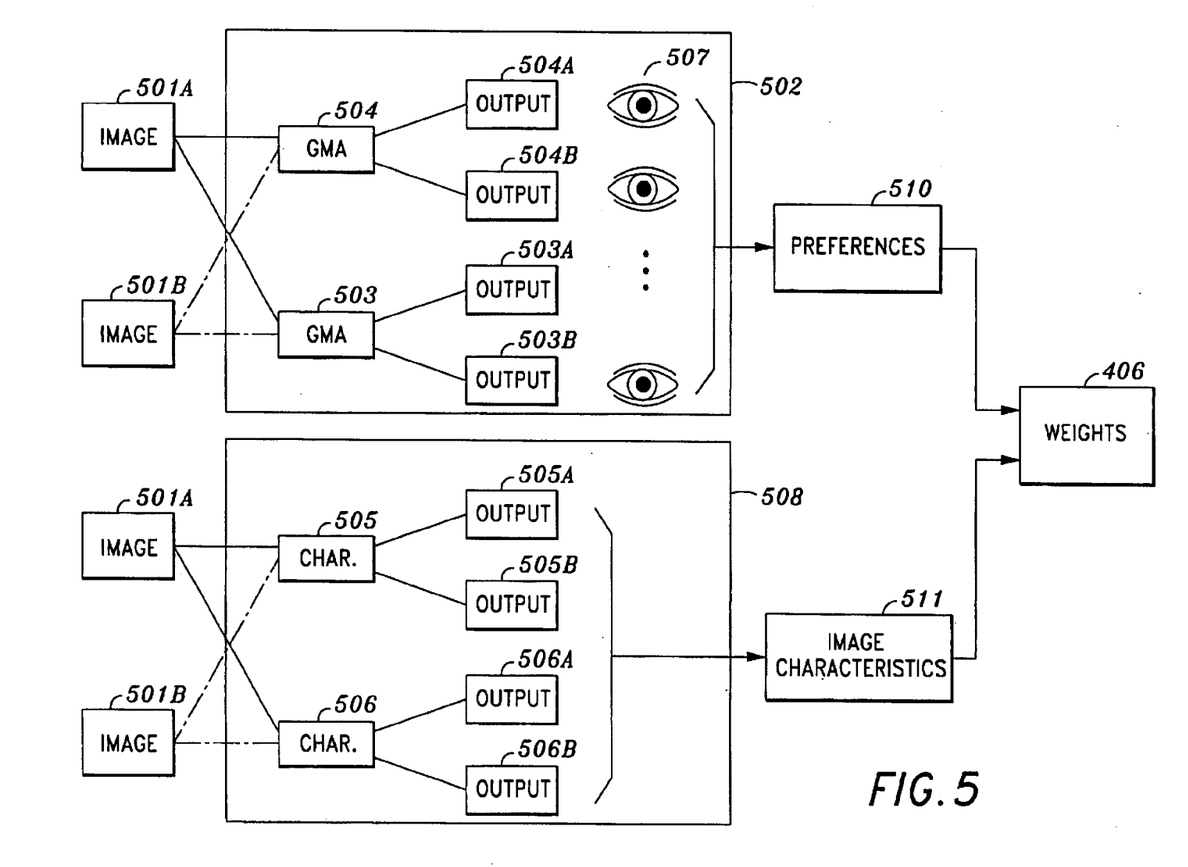
FIG. 5 provides a process overview for collecting empirical information that is used to generate weights according to the present invention.

Weights 406 are determined based on an empirical testing involving the collection of observer preferences to output images generated by GMAs 410 from input test images whose characteristics have been determined according to the present invention. FIG. 5 provides a process overview for collecting empirical information that is used to generate weights 406 according to the present invention. It should be apparent that the number of images, GMAs and image characterizers used is for illustrative purposes, and that the present invention is not limited to those shown in FIG. 5.

Briefly, test images such as images 501A and 501B are input to empirical testing 502 and image characterization 508 to generate preferences 510 and image characteristics 511, respectively, which are used to generate weights 406.

Images 501A and 501B, which may comprise metadata 403, pixel data 404, or both, are each input to GMAs 503 and 504 as part of a image transformation such as that described with reference to blocks 103 to 105 of FIG. 1. Output images 503A and 504A are generated from input image 501A using GMAs 503 and 504, respectively. Similarly, output images 503B and 504B are generated from input image 501B and GMAs 503 and 504, respectively.

Output images 503A, 503B, 504A and 504B are viewed by observer(s) 507 to determine their preferences 510. That is, for example, the percentage of observer(s) 507 that prefer output image 504A over output image 503A is identified, and vice versa. Both output images 503A and 504A were generated from input image 501A using different GMAs (i.e., GMAs 503 and 504). Preferences 510 comprise a preference of observer(s) 507 to output images 503A and 504A and are combined with the characteristics of input images 501 A to identify the strengths and/or weaknesses associated with a particular GMA given particular image characteristics. Preferences 510 also include preferences with respect to output images 503B and 504B.

To obtain image characteristics 511, images 501A and 501B are input to image characterization 508. Image characterization 508 may comprise any number and type of characterizers that determine characteristics of images 501A and 501B. Image 501A is input to image characterizers 505 and 506 to yield image characteristics 505A and 506A. Similarly, image 501B is input to image characterizers 505 and 506 to yield image characteristics 505B and 506B.

The empirical data, which comprises preferences 510 and image characteristics 511, are used to generate weights for a GMA and image characteristic combination. The weights are used to generate prediction information. The empirical data corresponding to the GMAs is gathered that reflects the strengths and weaknesses of particular GMAs with regard to characteristics of image data. For a given characteristic, input images which vary with respect to the degree or amount of characteristic (e.g., input images that vary with respect to the degree of redness of the images) are input to each of the GMAs, and for a given input image a percentage of observer(s) 507 that prefer a given output image (i.e., images generated for each GMA from the input) is recorded along with the value of the characteristic for the input image. The recorded preferences, which may be recorded as a percentage of observer(s) 507 that prefer a given image, are then used to generate a scoring for each GMA relative to the characteristic.

Figure 6:
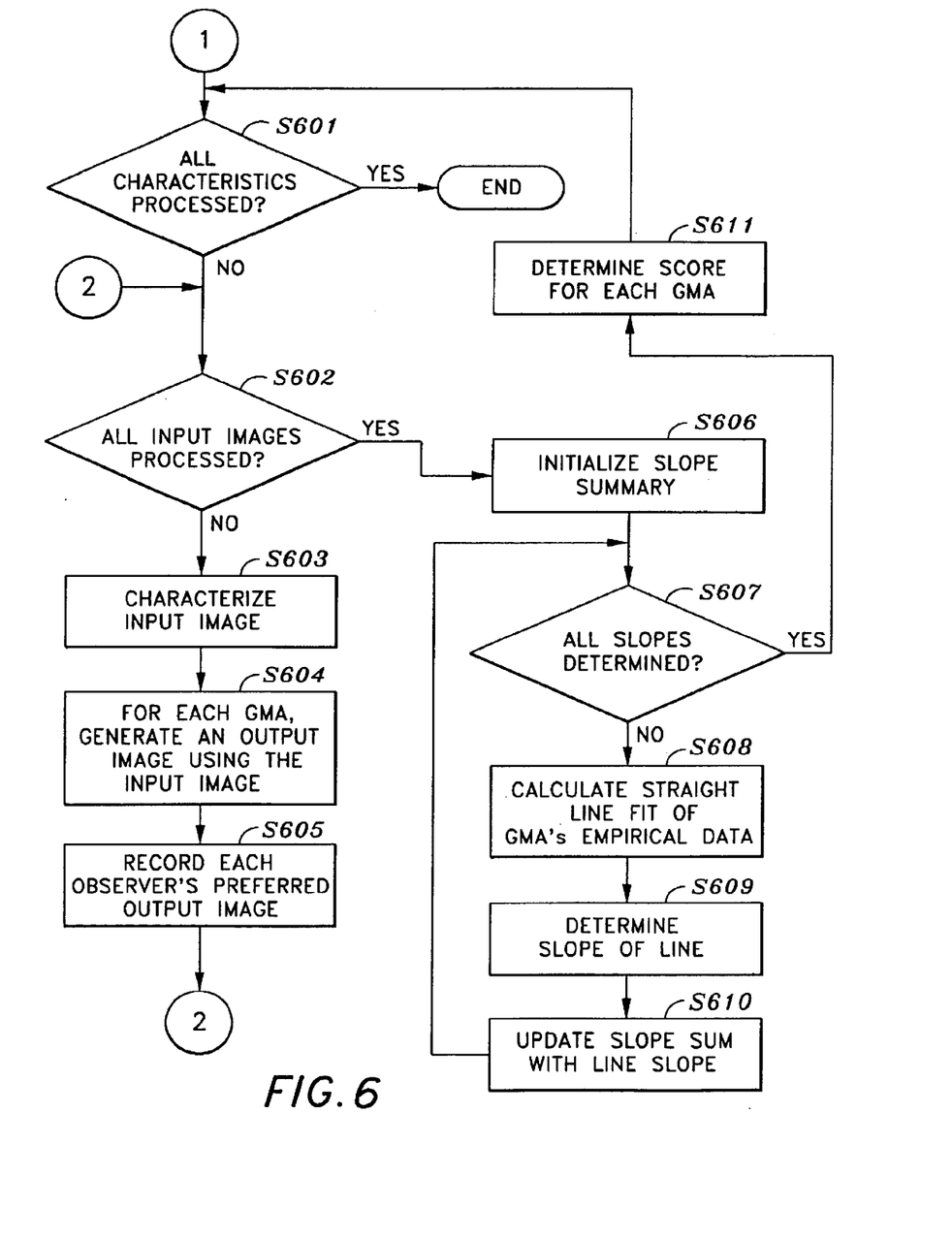
FIG. 6 illustrates a flow diagram of process steps to generate weights from collected empirical information for use in generating scores for GMA selection according to the present invention.

FIG. 6 illustrates a flow diagram of process steps to generate weights from collected empirical data for use in generating scores for GMA selection according to the present invention.

At step S601, a determination is made whether all of the characteristics for which weights 406 are to be generated have been processed. If so, processing ends. If not, processing continues at step S602 to determine whether all of the input images for a given characteristic have been processed. If not, processing continues at step S603 to generate a value for a characteristic of the input image using a characterizer (e.g., image characterizers 405A and 405B).

At step S604, an output image is generated using each of the GMAs from the input image. At step S605, preferences (e.g., preferences 510) of observer(s) 507 are recorded. That is, from the output images that are generated in step S604, the output image that is preferred by each of observer(s) 507 is recorded. Processing continues at step S602 to process any remaining input images. For example, another input image that contains a different level of the characteristic, or that has a particular combination of characteristics, may be processed to obtain observer(s) preferences 510.

If it is determined, at step S602, that all of the input images have been processed, processing continues at step S606 to initialize a slope summary variable that is updated to include an aggregate of the slopes for each GMA for the characteristic. At step S607, a determination is made whether a slope has been determined for each of the GMAs.

If not, processing continues at step S608. As is described below with reference to FIG. 8A, the data that is collected for a given GMA and characteristic may be plotted with the preference on one axis and characteristic value on another axis. At step S608, a straight line is calculated (e.g., using a straight line fit function) from the characteristic and preference data collected for a given GMA and characteristic. At step S609, a slope is determined for the line generated in step S608. At step S610, the slope is added to the aggregate slope variable, and processing continues at step S607 to calculate a slope for any remaining GMAs.

If it is determined, at step S607, that there are no more GMAs for the given characteristic, processing continues at step S611 to generate a score for each GMA. A GMA's score is determined to be the ratio of the GMA's slope to the aggregate slope value (i.e., the sum of the slopes generated in step S610 from the slopes determined for each of the GMAs in step S609).

Figure 7:
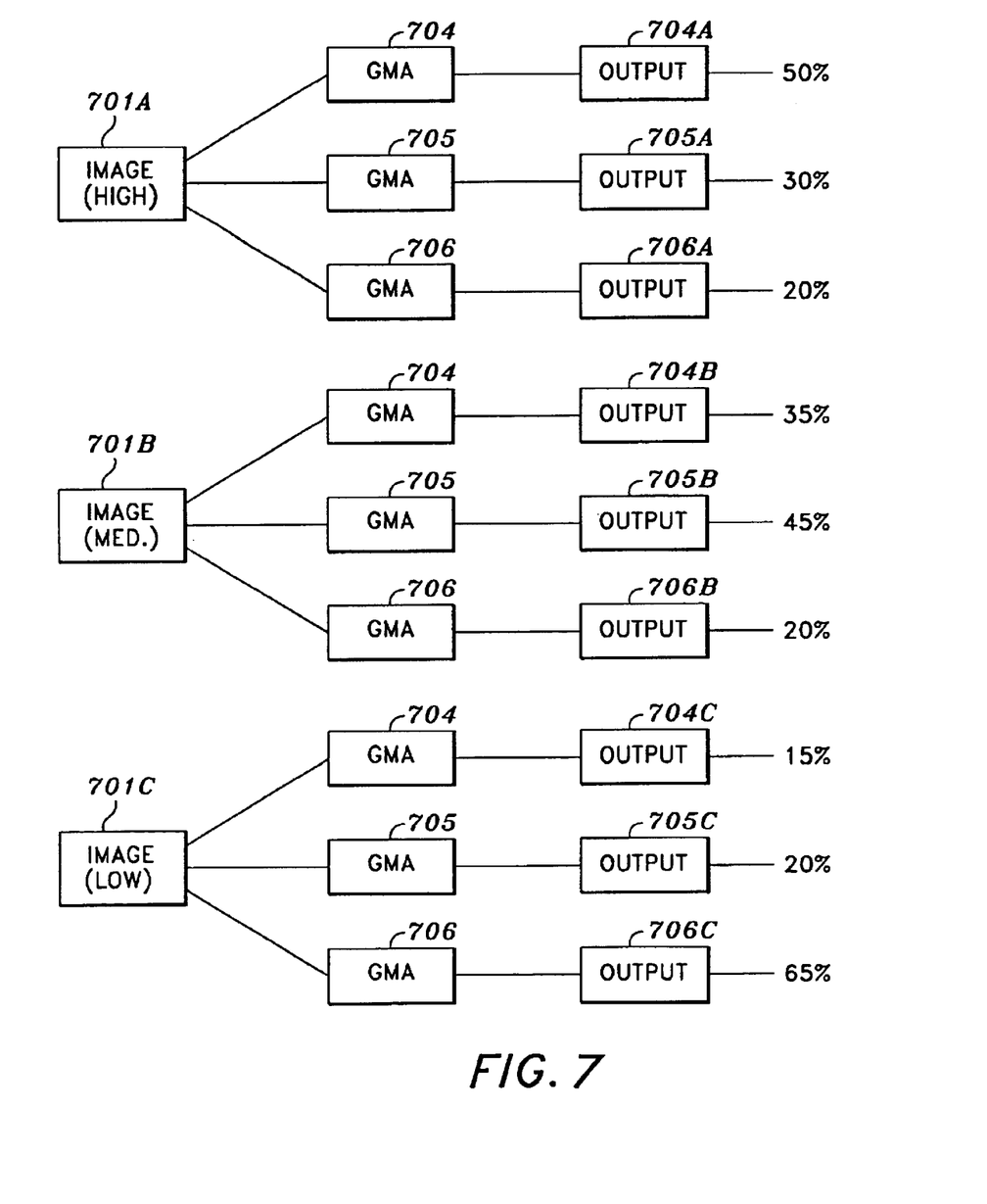
FIG. 7 illustrates an approach used to collect preferences of observer(s) with regard to a redness characteristic according to the present invention.

FIG. 7 illustrates an overview of a process of collecting observer preferences 510 conducted in steps S604 and S605 with regard to a redness characteristic according to the present invention.

The redness characteristic may be based on the CIELAB metric hue angle of pixel data 404. A range of hue angles may be used to identify a high, medium and low amount of redness. Images 701 to 703, which contain varying degrees of redness, are transformed using GMAs 704 to 706. Output images 704A, 705A and 706A are generated from image 701A (which contains a high degree of redness), and based on observations of observer(s) 507, the output image generated by GMA 704 was preferred by 50% of observer(s) 507 and was preferred more frequently than the images generated by GMAs 705 and 706. That is, with respect to images that have a high degree of redness, GMA 704 is preferred over GMAs 705 and 706.

As indicated in FIG. 7, a similar approach may be repeated with images that contain medium and low degrees of redness. As a result, it is possible to identify which one of GMAs 704 to 706 is preferable for images that contain high, medium and low amounts of redness. Based on the results indicated in FIG. 7, if redness is the only characteristic used to select a GMA, GMA 704 is preferred in a case that an image has a high level of redness, GMA 705 is preferred with a medium amount of redness and GMA 706 is preferred for images with a low redness level.

Of course, in the above example, only the redness characteristic is used to identify preferences 510 associated with a given GMA, and then to select a GMA based on these preferences. It is possible using the present invention to determine preferences for combinations of image characteristics. Thus, for example, a colorfulness characteristic may also be determined for images 701A to 701C. In so doing, it is possible that another set of preferences may be derived from preferences 510 of observer(s) 507, which corresponds to a combination of a redness characteristic (e.g., a high degree of redness) and a colorfulness characteristic (e.g., a low degree of colorfulness), for example.

Preferences 510 of observer(s) 507 are used to generate one or more weights associated with a GMA that are used to predict an optimal GMA for an image with a given set of characteristics. Referring again to FIG. 6, once it is determined at step S602 that all of the test input images have been processed to obtain GMA preferences 510, processing continues at step S606 to generate a weight for each GMA and tested characteristic.

Various techniques may be used to generate the weights. An exemplary technique is described above with reference to FIG. 6, which involves determining, for each characteristic and GMA combination, a slope of a straight line generated from "x" and "y" values, where the x-values correspond to values of the characteristic and the y-values correspond to the percentage of observer(s) 507 that selected the GMA for a given characteristic value. In this example, the prediction score for a given GMA relative to a specific characteristic is a ratio of the GMA's slope to the sum of the slopes for all of the GMAs.

Using the technique described in FIG. 6, once all of the test images have been processed for a given characteristic, a slope is determined for each GMA based on the preferences 510 of observer(s) 507, and a weighting is generated based on a ratio of the GMA's slope to the aggregate of the slopes of all of the GMAs. For each GMA, a straight line is determined using the recorded preferences 510 associated with a GMA. A slope is determined for the line, and the GMA's line slope is added to the aggregate slope. Once all of the GMAs have been processed, a weight is determined for each GMA that is the ratio of a GMA's slope to the aggregate slope.

Figure 8A:
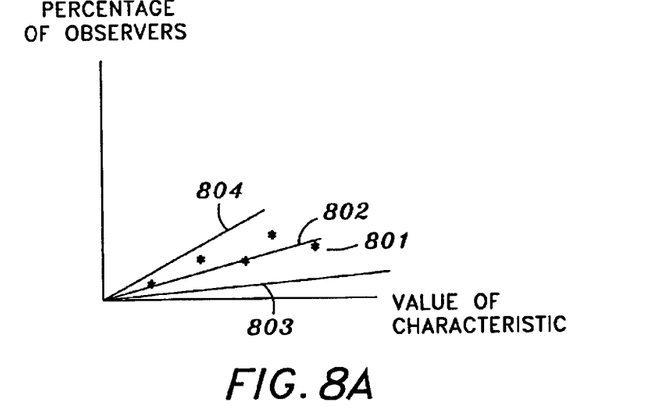
FIG. 8A illustrates data graphs corresponding to three GMAs, the data graphs represent preferences of one or more observers with respect to a given characteristic.

FIG. 8A illustrates data graphs corresponding to three GMAs, the data graphs represent preferences 510 of observer(s) 507 with respect to a given characteristic. Values for the given characteristic are plotted along the x-axis, and preferences 510 of observer(s) 507 are plotted along the y-axis. Line graphs 802 to 804 are each associated with a different GMA, and are generated from data for each GMA that represents preferences 510 for the GMA given a value of the characteristic. Each of points 801 represents a "y" percent of observer(s) 507 that preferred the GMA when a characteristic of the input image had an "x" value. Line graphs 802 to 804 may be generated using a method such as a straight line fit method (e.g., linear regression). Each of line graphs 802 to 804 has a corresponding slope which is calculated and used to determine a weighting as described above.

Figure 8B:
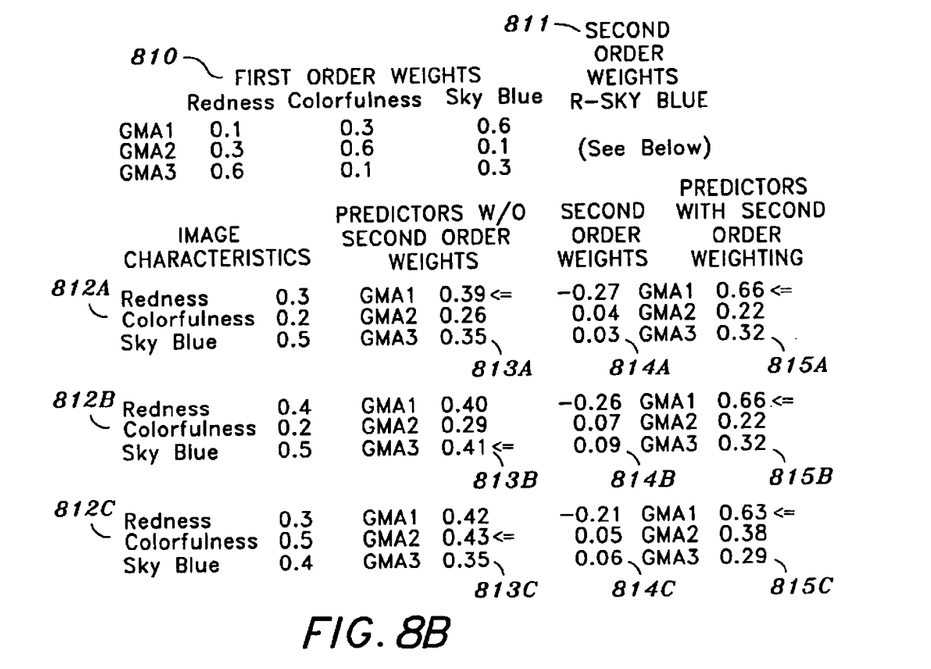
FIG. 8B illustrates a GMA selection based on predictors determined for each GMA based on the weightings derived from the empirical data obtained from observer preferences and image characterizations according to the present invention.

FIG. 8B illustrates a GMA selection based on predictors determined for each GMA based on the weightings derived from the empirical data obtained from preferences 510 and image characterizations according to the present invention. The example of FIG. 8B includes prediction information that is generated from first-order weights and prediction information generated from second-order weights. Second-order weights are some combination of two or more first-order weights. It should be apparent that third, fourth, etc. order weights may also be used with the present invention. In addition, any technique may be used to combine weights.

For the sake of example, line graphs 802 to 804 of FIG. 8A have slopes of 3, 1 and 6, respectively. Referring to first-order weights 810, for example, if the characteristic plotted in FIG. 8A is redness, line graphs 802 to 804 correspond to GMA1, GMA2 and GMA3, respectively. The value in weights 810 that corresponds to GMA1 is determined to be the slope of line graph 803 over the sum of the slopes of lines graphs 802 to 804, $\frac{1}{10}$ or 0.1. The remaining values in weights 810 are calculated in the same manner. Referring to weights 810, if the characteristic plotted on the x-axis of FIG. 8A is colorfulness, based on the values of weights 810 that correspond to colorfulness, line graphs 802 to 804 represent GMA3, GMA2 and GMA1, respectively. If the x-axis is used to plot the sky blue characteristic, line graphs 802 to 804 represent GMA2, GMA3 and GMA1, respectively.

Weights 810 are used with determined characteristics of an image to derive a weighted score, or predictor, which is in turn used to select a GMA. In the example of FIG. 8B, redness, colorfulness and sky blue characteristics of the image are used to predict a preferred GMA. Predictors 813A are obtained from image characteristics 812A and weights 810. Based on predictors 813A, GMA1 has the best score for the given image characteristics 812A and is selected.

To derive predictors 813A according to the present invention, for each GMA, each characteristic's value in image characteristics 812A is multiplied by its corresponding weight in weights 810, and the products are summed. A predictor is obtained for GMA1 using the following exemplary formula:

Redness Char. Value*GMA1's Redness weighting+Colorfulness Char. Value*GMA1's Colorfulness Weighting+Sky Blue Char. Value*GMA1's Sky Blue Weighting In the case of GMA1, a predictor score of 0.39 is obtained as follows:

0.3*0.1+0.2*0.3+0.5*0.6=0.39

Predictor scores for GMA2 and GMA3 based on image characteristics 812A and weights 810, which are obtained in a similar fashion, are 0.26 and 0.35, respectively. Accordingly, GMA1 is selected, since it has the best score of predictors 813A.

Using image characteristics 812B and weights 810, predictors 813B are obtained for GMA1, GMA2 and GMA3. Similarly, predictors 813C are derived from image characteristics 812C and weights 810. Based on predictors 813B, GMA3 is selected for an image having image characteristics 812B. GMA2 is selected based on predictors 813C for an image with image characteristics 812C.

Each column in weights 810 represent a single characteristic, and each row corresponds to a given GMA. It is possible for a column to reflect more than one characteristic, or a combination of characteristics. Second-order weights 811 provide an example of a combined weight. Weight 811 represents a combination of the redness characteristic and the sky blue characteristics. The Redness-Sky Blue second-order weighting is determined for each GMA as follows:

Redness Char. Value*GMA's Redness Weighting–Sky Blue Char. Value*GMA's Sky Blue Weighting For GMA1, the Redness-Sky Blue weighting is determined as follows:

$$0.3*0.1-0.5*0.6, \text{ or } -0.27$$

A similar approach is taken to derive the second-order weights 814A for GMA2 and GMA3, and for deriving weights 814B and 814C for GMA1, GMA2 and GMA3.

Predictors 815A are derived using first-order weights 810 and second-order weights 811. In this example, each GMA's predictors 815A is derived by subtracting the GMA's second-order weight 814A from its corresponding predictor 813A.

Based on predictors 815A, GMA1 is selected, since it has the best score. Predictors 815B and 815C are derived in the same manner as predictors 815A, and reflect both second-order and first-order weights.

In the example of FIG. 8B, use of second-order weights 814A to 814C to derive predictors 815A to 815C, respectively, results in a different GMA being selected in the case of predictors 815B and 815C. That is, a different GMA is selected than that selected when using predictors 813B and 813C.

Weights 810 and 811 are given in the form of a matrix in FIG. 8B with each column containing a coefficient (i.e., or weighting) that is applied to a value of the same characteristic found in an input image to generate predictor score as discussed above. A coefficient may represent a linear term (e.g., a single term such as colorfulness or redness) or a non-linear term which represents some combination of linear terms (e.g., a combination of redness and sky blue terms).

A neural network may be used by selection engine 407. A neural network is typically organized in layers, with each layer comprising a number of interconnected nodes with associated functions. According to the present invention, an input layer receives the characteristics of an image which are operated on by one or more internal layers of the neural network to generate prediction information which is in turn used to select a GMA. In the training phase, each of the nodes of the internal layer(s) generates a weight which the neural network determines based on initial weights (e.g., weights 810, 811 and/or results based on a threshold comparison) and error corrections performed by the neural net.

Once the neural network is "trained", it switches to become a selection tool that receives as input the characteristics of an image (e.g., image 402) and provides as output a selected GMA.

For example, a "redness node" of the input layer can generate a predictor based on an image's level of redness and a weighting associated with the redness characteristic. Similarly, a "colorfulness node" may generate a weighting based on whether (and/or to what extent) the image's colorfulness characteristic value exceeded a colorfulness threshold. Output can then be used by other nodes in the same or a subsequent layer to arrive at a selected GMA.

Figure 9:
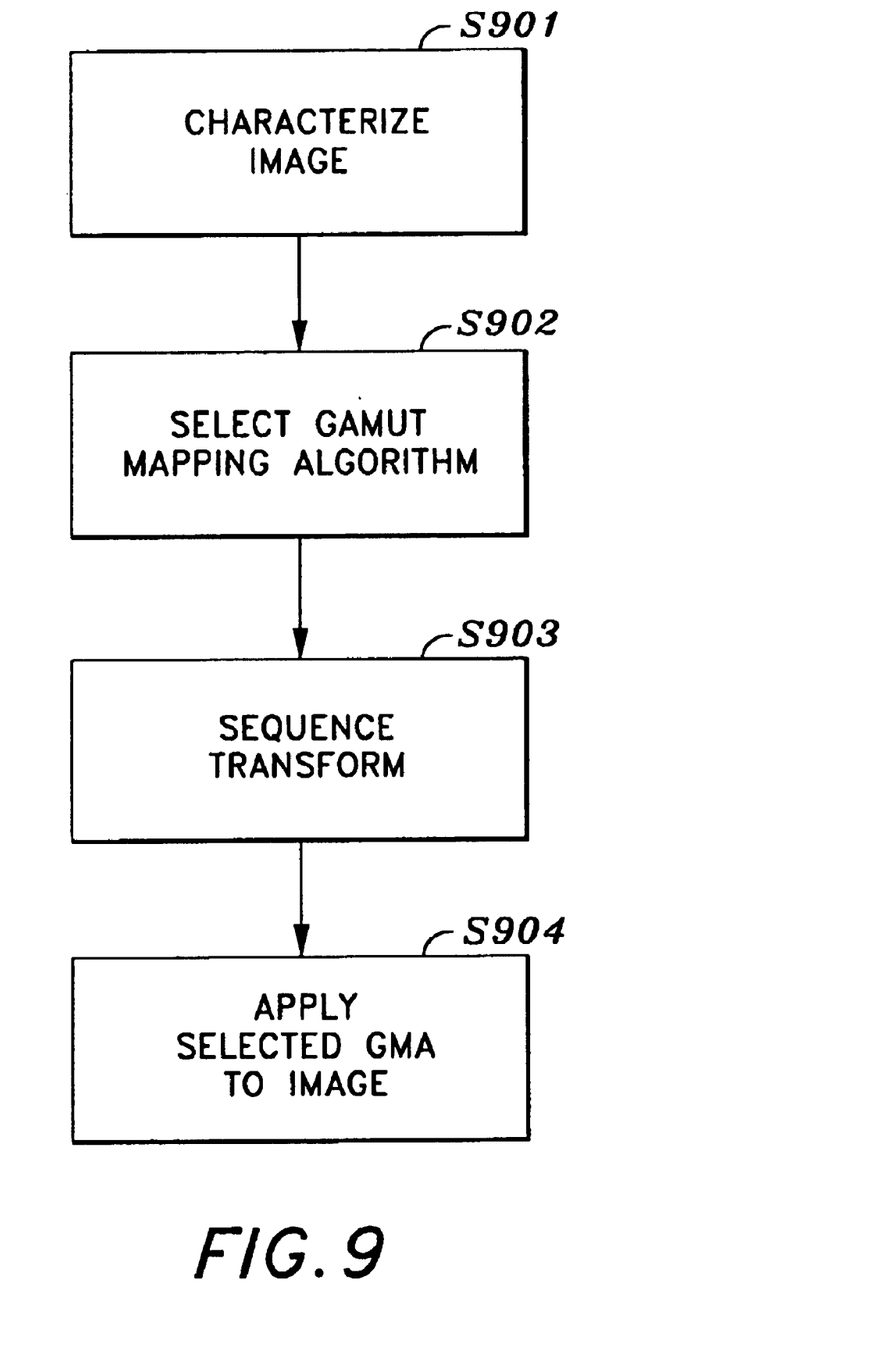
FIG. 9 illustrates a flow diagram of process steps to select a GMA and generate an output image from an input image using a selected GMA according to the present invention.

A GMA that is selected according to the present invention is in turn used to generate an output image. FIG. 9 illustrates a flow diagram of process steps to select a GMA and generate an output image from an input image using the selected GMA according to the present invention.

At step S901, an input image (e.g., image 402) is characterized using image characterizers (e.g., 405A and/or 405B) to generate image characteristics. In order to perform the image characterizations, image 402 may be converted to an intermediate form (e.g., an appearance form such as that operated on in block 104 of FIG. 1), but need not be. That is, according to the present invention, image characterizers 405A and 405B may use the raw input image data, or some form thereof.

At step S902, the collected image characteristics are input to selection engine 407 to select a GMA. As discussed above, the collected image characteristics are coupled with weights 406 to generate scoring which is in turn used to select a GMA. At step S903, a transform is created based on the selected GMA and device characteristics, or profiles. At step S904, input image 402 is gamut transformed using the transform created in step S903. In order to perform the transformation, input image 402 is preferably converted to an appearance form (or device independent form) before it is transformed using the transformation created in step S903.

Figure 10A:
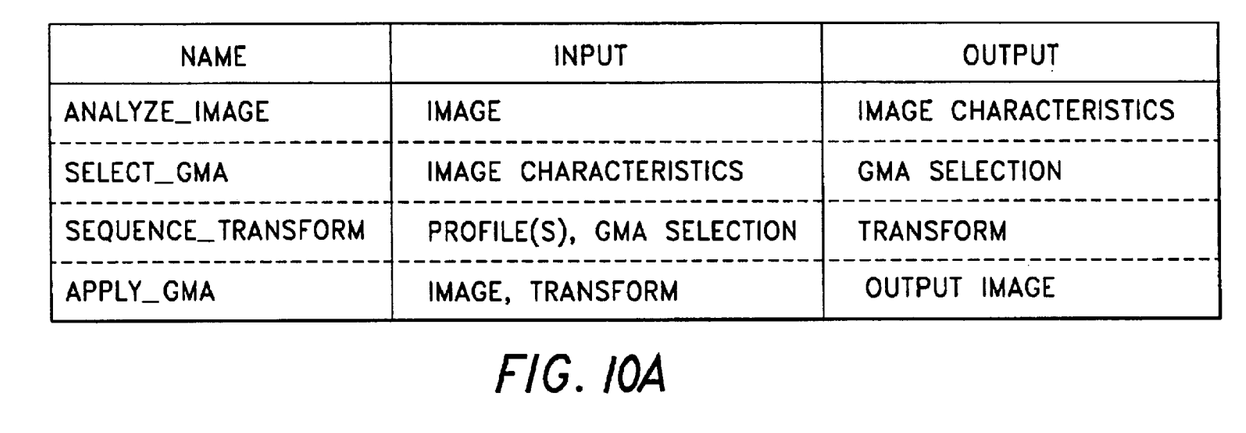
FIGS. 10A and 10B illustrate examples of an application programming interface (API) which provide an interface to functions which perform the process steps of FIG. 9.
Figure 10B:
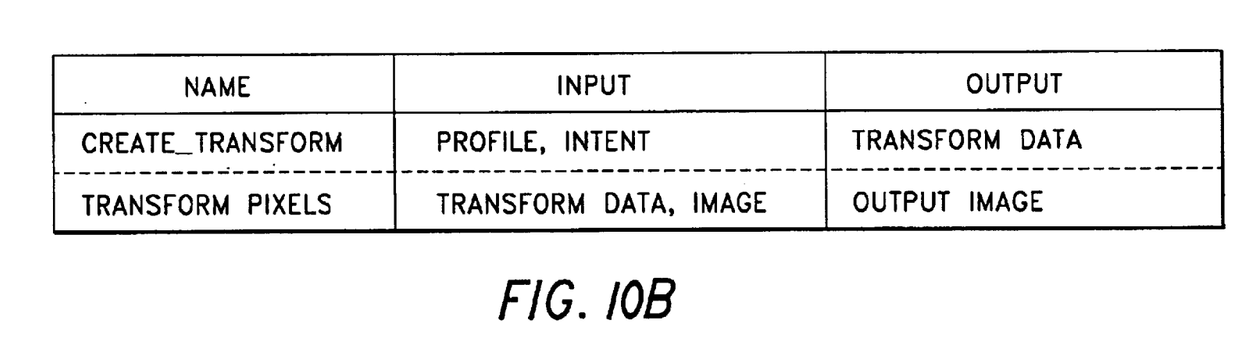

A color management system may provide an application programming interface (API) to be used by an application program to perform the steps of FIG. 9. FIGS. 10A and 10B illustrate examples of an application programming interface (API) which provide an interface to functions which perform the process steps of FIG. 9.

Referring first to FIG. 10A, a function, named ANALYZE_IMAGE, receives as input the image (input image 402) and generates image characteristics as output. The ANALYZE_IMAGE function causes input image 402 to be characterized by one or more image characterizers (e.g., image characterizers 405A and/or 405B). The image characteristics output by ANALYZE_IMAGE become input to the SELECT_GMA function, which uses the image characteristics and weights 406 to select a GMA as discussed above. The SELECT_GMA function outputs a GMA selection (i.e., an identification of the selected GMA). The GMA selection and device profile information become input to the SEQUENCE_TRANSFORM function, which outputs a transformation. The APPLY_GMA function uses the transformation generated by SEQUENCE_TRANSFORM to output a transformed image.

In the API example of FIG. 10A, each of steps S901 to S904 is performed in a separate call the API. In so doing, it is possible for a program developer to have some visibility into the functionality of the API. In addition, the data that is output by the functions may be made available to the calling program for some other use. For example, the image characteristics that are output by the ANALYZE_IMAGE function may be retained so that the image characterization need not be repeated. For example, the image characteristics may be saved as metadata in input image 402. Similarly, other data, which is generated by the API, (e.g., the transform output of SEQUENCE_TRANSFORM) may be retained separately or as part of input image 402.

While a separate function is used for each of steps S901 to S904 in the example of FIG. 10A, it is possible to combine the functionality. For example, steps S901 may be performed by ANALYZE_IMAGE, and steps S902 to S904 may be performed in a single function. As another alternative, the steps of FIG. 9 may be combined to achieve performance advantages. For example, steps S901 and S902 may be performed by a personal computing system such as computer 1, and steps S903 and S904 may be performed by a raster image processor (RIP) which is dedicated to performing the tasks associated with steps S903 and S904. In such a case, for example, an ASIC may be used to process the image data to perform steps S903 and S904.

An application that uses the color management capabilities of the present invention may use the functionality of the API provided in FIG. 10A by including the appropriate syntax in the application's program code for invoking the functions provided. However, there may be a desire not to alter the program code of existing applications in order to make use of the functionality of the present invention. In such a case, it is possible to use an API such as that provided in FIG. 10B.

In the example of FIG. 10B, it is assumed that an application program makes calls to two functions (i.e., CREATE_TRANSFORM and TRANSFORM_PIXELS) to generate a gamut transformed output image. In order to make use of the present invention's capabilities without the need to alter existing application program code, dynamic selection of a GMA according to the present invention may be embedded within the TRANSFORM_PIXELS API function. In addition, the same data structures are used in the invocation of the functions. By doing so, there is no need to alter existing application program code in order to dynamically select a GMA according to the present invention.

For example, a call to the CREATE_TRANSFORM function includes as input a device profile (or profiles) and an "intent" data structure, which identifies preferences (e.g., calorimetric, saturation and perceptual preferences). According to the present invention, the same information is input to the CREATE_TRANSFORM function. However, instead of creating a transform using the profile and intent input, CREATE_TRANSFORM outputs a transform data structure which contains the profile and intent data. In this example, the CREATE_TRANSFORM function operates to pass its input on to the TRANSFORM_PIXELS function.

The TRANSFORM_PIXELS function uses the profile and intent information stored in the transform data structure and the image as input to perform steps S901 to S904. That is, a call to the TRANSFORM_PIXELS function results in the generation of image characteristics, selection of a GMA, creation of a transform using the selected GMA, and application of the transform to the selected image.

Using the modules as described above, dynamic selection of a GMA occurs within an existing function (i.e., TRANSFORM_PIXELS) of the API. Therefore, an application program that calls the API need not be aware that a GMA is being dynamically selected. Thus, the dynamic selection is transparent to the application program that invokes the program interfaces of the color management system. Advantageously, there is therefore no need to alter the application programs that invoke the program color management system's modules.

In FIGS. 10A to 10B, device profile(s) which are used may be particular to a given imaging device, and comprise settings or other information that are used to calibrate the device so that output of the device is consistent across time and across devices. A device profile is generated using a device characterization process that maps desired results with the capabilities of the device. For example, through characterization, it is possible to take into account the gamut boundaries of the device, and to map known colors to the device's color gamut.

Color profiles such as an ICC (International Color Consortium) profile provides a format for storing device characterizations and include tags that identify the characterization data. In the present invention, a new tag may be used to store the matrix values (e.g., weights 810 and 811) and/or information used to train the neural network.

Advantageously, if the weights are different for each device, storing the weightings in each device's profile allows the present invention, and the color management system that uses the present invention, to be customized to a particular device. If, however, the weightings are the same across devices, they may be stored external to the device profile(s) and accessed to initialize selection engine 407 for use with any device.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method of dynamically selecting a gamut mapping component for use in a color management system which transforms colors specified in image data from a first color space to a second color space, the method comprising:

pre-storing weights corresponding to gamut mapping components and image characteristics, detecting at least one characteristic of the image data;

automatically generating prediction information for use in selecting from a plurality of gamut mapping components based on the pre-stored weights and the detected characteristic of the image data; and automatically selecting at least one of the plurality of gamut mapping components based on the prediction information.

2. A method according to claim 1, wherein the characteristic is detected based on the colors of the image data.

3. A method according to claim 1, wherein the image data includes metadata, the characteristic is detected based at least in part on the metadata.

4. A method according to claim 3, wherein the metadata is automatically generated during generation of the image data.

5. A method according to claim 4, wherein the image data is generated by an image capture device, and wherein the metadata comprises information associated with the image capture.

6. A method according to claim 5, wherein the image capture information includes one or more of aperture, exposure time and flash usage information.

7. A method according to claim 4, wherein the metadata is user-specified, and wherein the metadata comprises annotations to the image.

8. A method according to claim 1, wherein the characteristic is detected based at least in part on an image pixel hue characteristic.

9. A method according to claim 1, wherein the characteristic is detected based at least in part on an image pixel chroma characteristic.

10. A method according to claim 1, wherein the characteristic is detected based at least in part on a redness characteristic.

11. A method according to claim 1, wherein dynamic selection of a GMA is performed using a neural network.

12. A method according to claim 1, wherein the prediction information comprises at least one predictor of output quality for each of the plurality of gamut mapping components.

13. A method according to claim 12, wherein a gamut mapping component is selected based on the at least one predictor associated with each of the plurality of gamut mapping components for the given predictor.

14. A method according to claim 1, further comprising:
transforming the image data from the first color space to the second color space using the selected gamut mapping component.

15. A method according to claim 14, wherein transformation of the image data is performed in a transformation pipeline, the selection of a gamut mapping component is performed outside the transformation pipeline.

16. A method according to claim 14, wherein transformation of the image data is performed in a transformation pipeline, the selection of a gamut mapping component is performed within the transformation pipeline.

17. A method of claim 1, wherein a value of a pre-stored weight is determined based on a gamut mapping preference corresponding to an image characteristic.

18. A method of dynamically selecting a gamut mapping component for use in a color management system which transforms colors specified in image data from a first color space to a second color space, the method comprising:
automatically generating prediction information for use in selecting from a plurality of gamut mapping components, wherein the prediction information is based on determined gamut mapping preferences corresponding to at least one characteristic of the image data; and
automatically selecting at least one of the plurality of gamut mapping components based on the prediction information,
wherein the prediction information is based at least in part on a redness characteristic, and wherein the redness characteristic is defined as a proportion of pixels having a CIELAB metric hue angle within a given range and a CIELAB metric chromas that satisfies a given chroma threshold.

19. A method of dynamically selecting a gamut mapping component for use in a color management system which transforms colors specified in image data from a first color space to a second color space, the method comprising:
automatically generating prediction information for use in selecting from a plurality of gamut mapping components, wherein the prediction information is based on determined gamut mapping preferences corresponding to at least one characteristic of the image data; and
automatically selecting at least one of the plurality of gamut mapping components based on the prediction information,
wherein the prediction information comprises a colorfulness predictor, and wherein a colorfulness characteristic is defined as a proportion of pixels with CIELAB metric chromas greater than or equal to a colorfulness threshold.

20. A system for dynamically selecting a gamut mapping component for use in a color management system to transform colors specified by image data from a first color space to a second color space, the system comprising:
pre-storing, in a storage medium, weights corresponding to gamut mapping components and image characteristics;
at least one image characterizer configured to automatically detect a characteristic of image data;
selection engine configured to generate prediction information for use in selecting from a plurality of gamut mapping components based on the pre-stored weights and the detected characteristic of the image data, wherein the selection engine is configured to automatically select at least one of the plurality of gamut mapping components based on the prediction information.

21. A system according to claim 20, wherein the prediction information comprises at least one predictor of output quality for each of the plurality of gamut mapping components.

22. A system according to claim 21, wherein a gamut mapping component is selected based on the at least one predictor associated with each of the plurality of gamut mapping components.

23. A system according to claim 20, wherein a value of a pre-stored weight is determined based on a gamut mapping preference corresponding to an image characteristic.

24. Computer-executable program code stored on a computer-readable medium, said computer-executable program code, which dynamically selects a gamut mapping component for use in a color management system which transforms colors specified in image data from a first color space to a second color space, comprises:
code to pre-store weights corresponding to gamut mapping components and image characteristics;
code to detect at least one characteristic of the image data;
code to automatically generate prediction information for use in selecting from a plurality of gamut mapping components based on the pre-stored weights and the detected characteristic of the image data; and
code to automatically select at least one of the plurality of gamut mapping components based on the prediction information.

* * * * *